Patented Aug. 14, 1923.

1,464,698

UNITED STATES PATENT OFFICE.

JAMES H. DELANY, OF SAN JOSE, CALIFORNIA.

MANUFACTURE OF HEAT-INSULATING ARTICLES.

No Drawing.   Application filed November 22, 1921. Serial No. 517,138.

*To all whom it may concern:*

Be it known that I, JAMES H. DELANY, a citizen of the United States, residing at San Jose, in the county of Santa Clara and State of California, have invented certain new and useful Improvements in the Manufacture of Heat-Insulating Articles, of which the following is a specification.

My invention relates to the art of manufacturing articles having heat-insulating properties due to a vacuum hermetically sealed in glass. It consists in the novel improvement, method or process hereinafter fully described, and has for its object, briefly stated, the production of said articles with walls of such greatly increased thickness and strength and at such comparatively low cost of manufacture, as to permit of the adaptation of this well known principle of heat insulation to uses heretofore considered impossible.

In order to make clear the nature and utility of my invention, I deem it best to call attention, preliminarily, to certain matters, which though well known, may yet serve to distinguish my improvement and conduce to its better understanding. There are many kinds, varieties and qualities of glass known to the trade, the characteristics of the kinds and grades varying according to the ingredients from which they are made, and the degree of refinement used in the process of their manufacture, these mixtures and refining processes being regulated according to the purposes for which the glass is intended to be used; thus, we have a range of qualities extending from the most common, low priced and the so-called "green" and "flint" glasses up to the relatively expensive and very fine "glassblowers" and the "Bohemian" grades.

In general, all glass when cold, possesses great hardness, extreme brittleness, lacks elasticity and is a poor conductor of heat, although having a notable coefficient of expansion under heat. Its ductility when hot, and its physical strength after having been drawn or blown to very thin cross sectional area and allowed to cool, somewhat like those of iron for instance, may be greately improved by repeated heat treating and working, as a result of which it is found that, whereas simple, single walled articles roughly made for ordinary or common usage, such as bottles for instance, are mold blown by compressed air, direct from the molten glass as derived from the orginial fusion of the ingredients entering into its composition, the finer products of the glassblower's art, such as the bulbs for incandescent electric lamps, or double walled containers from the internal hollow spaces of which it is intended to ultimately exhaust the air as a means of making the containers heat insulating, for instance, are air blown from previously manufactured tubes of suitable glass, and are, in consequence, much more costly in proportion to the weight or amount of glass used. Again, glass as a substance is, like pig iron, relatively very cheap, the greater portion of the cost of many of the articles at present made from it being chiefly attributable to the element of labor entering into the manufacture.

Thin walled articles of glass intended for chemical laboratory and similar work where different portions of the same piece of glass are subjected to different degrees of heat, or articles of such a complex nature that the various principal parts entering into their construction, are first made separately and then joined by hot welding or fusing together, and thin walled articles for the permanent impounding of a vacuum by the welding closed of an aperture after the interior to which the aperture leads has been pumped free of air, have, for many years, been made in great quantities and unlimited varieties, but it has heretofore been found indispensable that the walls of such articles be blown (either by lung power or mechanically compressed air), extremely thin, for the well known reason that heat, when unequally or locally applied to a piece of glass, will produce a degree of expansion at the point of its application sufficient to cleave the adjacent and colder portions of the piece, unless the glass be extremely thin. The explanation of this destructive cleavage is simple, when it is remembered that glass when cold, is very brittle, and is a poor conductor of heat, yet has a material coefficient of expansion under heat; and as expansion occurs only at the point where heat is applied, the cleaving strain radiates from this point throughout the mass of glass in all directions both transversely and laterally. If the glass is very thin, the effect of the transverse strain is negligible and quickly relieved by heat penetration, while the effect of the lateral strain is absorbed by the slight degree of resilient flexibility found in very thin glass; yet, even under these conditions it is found necessary, by those skilled in the art of glass blowing, to materially warm an appreciable area of this thin glass, adjacent to the point at which it is proposed to concentrate heat in sufficient amount to render the glass plastic or in a state of fusion suitable for welding.

If the glass in question should be of any material thickness, it will be seen that since the heat must necessarily be applied solely to the exposed surfaces of the glass, and from these surfaces conducted into the interior mass, it follows that even where all exposed surfaces of the glass are simultaneously subjected to the same degree of heat, cleavage of the internal mass of the glass must occur unless either the glass is so thin as to permit of the practically instantaneous conduction of the heat throughout its mass, or, that the heat be applied so gradually to the exposed surfaces of the glass as to permit of the adjacent portions of the interior mass becoming duly and proportionately heated by conduction, and expanded accordingly.

It is also well known that hot glass, unless of extremely thin section, is subject to similar destructive internal strains when attempt is made to cool it quickly; from which it logically follows that a piece of hot glass wherein heavy sections are found immediately adjacent to much thinner sections, may not safely be subjected to quick cooling, as its lighter parts cooling, and, therefore, contracting in advance of the heavier parts, will cleave away from these parts.

Experience has proven that glass, above all other substances is, on account of its impermeability, best suited for the purpose of permanently excluding air from an evacuated space, and many experiments conducted in connection with the making of incandescent electric lamps, have shown that air is not satisfactorily and permanently excluded from the evacuated interior of a hollow article made of glass, unless all apertures leading to the evacuated interior from the external air, are hermetically closed by the hot welding of the glass itself.

As heretofore manufactured, articles of glass, in the interiors of which a vacuum has been impounded, have been produced only as the result of a series of three principal steps, occurring in the sequence hereinafter described; and it has been found necessary to make these articles with very thin glass walls in order, after the air has been withdrawn, to render possible the final sealing airtight of all entrance to their interiors, by the hot welding integral of the glass of which the articles are composed, for the reasons already explained. The first of the three principal manufacturing steps referred to is the blowing by lung power or by mechanically compressed air, to the desired form, of the articles; usually from a previously and separately manufactured tube of glass especially suitable on account of its ductility, for the production of very thin walled articles.

At the completion of this blowing operation, there is purposely left an opening or aperture leading to the hollow interior of the piece, which opening is usually surrounded by a collar or neck to be used in connection with the two succeeding steps. The cooling of the piece, so that its walls may acquire their maximum rigidity and strength, completes this first of the three main steps referred to. The second step of the three, consists of the connection of the hollow interior of the piece, through the aperture provided, with an extraneous source of air suction, such as is produced by the ordinary mercury or other vacuum pumps, and the exhausting of the air from the hollow interior of the cold piece until the required degree of evacuation has been obtained. The third step of the three, consists of first heating, usually by means of a blowpipe, the glass immediately surrounding the aperture through which the evacuation has been effected, to a plastic or molten state and then, while the vacuum is still being maintained by the extraneous source of suction, to close this aperture by bringing the surfaces of the heated glass surrounding it together in such a way that they become welded integral, thus permanently impounding the enclosed vacuum.

In considering the details of the three step process of manufacture and the character of the vacuum heat-insulating articles produced, it becomes apparent that if, during the first of the three steps described, the article or piece were to be air blown with relatively thick walls, the final sealing by welding, as a separate and subsequent operation, and as provided for in the third step, could not be made, since the necessary concentration of intense heat at the point where the welding must be effected, would prove destructive to the piece, for the reasons already explained.

But if, as a means of avoiding the destructive cleavage effect resulting from this unequal heating of thick glass, resort should be had to the expedient of re-heating the piece in its entirety to a degree which would permit of welding at the desired point, the pressure of the outside air upon the heated and, therefore, plastic walls of the piece, would cause them to collapse upon the vacuum which it was being sought to impound. Similarly, if it were to be found that by re-heating the entire piece to a degree just sufficient to cause the glass to lose its brittleness, as an operation preliminary to the concentration of a superior and welding heat at a desired point, it would still be found that the outside air pressure would crush in the walls, for the reason that glass when heated to a point where its brittleness disappears, at once becomes plastic and loses most of its structural strength. In short, the application of the third step to a thick walled article is impracticable.

Obviously, while any amount of sealing by hot welding might be accomplished with either a thick or a thin walled piece which still retained the original heat used in its initial blowing, as described under the first step, any attempt to exhaust the air by the method described under the second step from the interior of such a piece, with its walls in a semi-molten and highly plastic condition, would be out of the question, as the soft walls would be immediately drawn inward by the vacuum as created.

As the result of the conditions and methods above described, it is found that the commercial utilization, up to the present time, of the well known principle of heat insulation by means of a vacuum, has been confined principally to portable food or drink containers, made of very thin glass, of limited size and of such extreme fragility as to require that they be suspended within cushioned metallic cases. In fact, it has been found necessary to further offset the great structural weakness of vessels of the character described, as well as of the incandescent electric lamp bulb, by making them of cylindrical or spherical form, these forms being mechanically best suited for sustaining even the slight shock resulting from careful handling and resisting the crushing effect of the outside air.

The heat-insulating qualities of a vacuum being well known, the pre-eminent suitability of glass as a material for the permanent impounding of a vacuum being recognized; the impossibility of adapting articles made of very thin glass and, therefore, of extreme fragility, to any service where they would be subjected to any considerable strain, stress or shock being obvious; and the impracticability of making, by present known methods, vacuum type, heat-insulating articles of glass with walls other than of extreme thinness having been shown, my invention will now, the more readily, be understood.

It consists of an improvement, method or process whereby the manufacture of heat-insulating articles of relatively great strength, and comprising hollow single or double walled containers, casings or forms of glass, of any reasonable thickness, and within the interior of which a vacuum is permanently impounded by the welding airtight of the glass, is made possible; and whereby articles so made and of the general character described, may be produced so cheaply as to render their use commercially economical wherever it may be desirable to insulate heat.

As glass may be molded into an infinite number of shapes, is non-inflammable, is water, germ and mould proof, and not subject to deterioration of any kind unless subjected to great heat or certain unusual acids; may be made transparent, translucent, opaque or of any color and, as a result of my invention, may hereafter be made in the form of hollow bricks or tiles of the greatest heat insulating value and possessed of sufficient inherent structural strength to withstand all ordinary shocks as well as sustain great weights, for an infinite time, it will be seen that by the use of my invention a new and most useful class of product becomes available for an almost unlimited variety of uses, ranging from small and cheap heat insulating containers for food and drink, up to the floors, walls and roofs of buildings.

In order to better make clear the novel and original features of my invention, it will be well to again describe in some detail, even at the expense of repetition, the general method of working glass at present followed. In existing commercial practice, the only known way of distending a mass of molten glass outwardly with reference to its interior and in such a way as to cause the walls thus created to finally form a hollow article, is by introducing into the interior of the mass of molten glass, air under sufficient pressure to overcome the cohesiveness of the molten glass, which being highly plastic as well as ductile, becomes dilated accordingly. The introduction of air under pressure into the interior of the mass of molten glass is effected through a tube, (glassblower's pipe), and the glass having been dilated, the air pressure is removed and the piece as formed, is detached from the blowing tube, an aperture being purposely left leading to its interior, as in the case of bottles, incandescent electric lamp bulbs, double walled containers, etc.

The leaving of the aperture mentioned is not however, an incident inseparably connected with the detaching of the "blowpipe" or tube from the mass of blown glass; in actual fact it would be an easier and much more simple operation to detach the "blowpipe" without leaving my aperture whatsoever; but obviously a bottle in which there was no way provided for obtaining access to its interior, or an article from which it was intended to subsequently exhaust the air content for the purpose of forming a vacuum-principle, heat-insulating container of the type at present known, would be equally unusable if the aperture were to be omitted.

By my improvement the necessity for first exhausting and then sealing airtight by welding, said interiors is entirely eliminated, for, as the first and essential step of my invention, I produce the required dilation or distention of the glass outwardly with reference to its interior, by introducing into the interior of the molten glass and in place of the compressed air heretofore employed, a vapor or gas, or a material suitable for producing a vapor or gas, of such a nature as to be capable of being condensed or precipitated by a degree of temperature inferior to that at which glass ceases to be ductile or plastic and at which latter temperature the glass, though becoming brittle, is sufficiently strong and rigid to successfully withstand the crushing effect of the outside air pressure resulting from the vacuum about to be created within by the condensation or precipitation of the impounded vapor or gas.

The piece or article having been blown, and its hollow interior being filled with the condensable vapor or gas to the exclusion of all air, the "blowpipe" is then detached while the glass is still in a sufficiently heated or plastic state to permit of its being welded air tight, and the hermetic permanent integral sealing is effected.

In the making, by my process, of pieces of moderate size and of such proportions that the unsupported dead weight of the walls would not be sufficient to cause them to sag while yet in a plastic condition, the final sealing or welding air tight of the piece takes place while the vapor or gas within is at approximately the same pressure as that of the surrounding atmosphere. But in the making of larger and heavier pieces whereof the walls are of such extent and thickness that they would, unless supported sag of their own weight, it is desirable that the final welding tight of the interior of the piece shall only occur while the vapor or gas which it is sought to impound is at a pressure sufficiently superior to that of the outside surrounding air to serve as an internal supporting medium for the walls during the early stages of the cooling process; the amount of this excess of internal pressure being gauged by the weight, extent and degree of plasticity of the walls at the time the sealing airtight occurs.

It will be noted that in my process of manufacture, I entirely dispense with practically every feature now incident to and necessary for the manufacture of articles of glass from the interiors of which the air is mechanically extracted by extraneous means. The general results obtained by the three necessarily separate steps now ordinarily used, and herein above described are, by my process, accomplished coincident with and as a part of the original blowing process by which the hollow article of glass is produced.

Under my process of manufacture, the making complete of heat-insulating articles of glass, having their interior spaces free from air, is made possible from molten glass as taken directly from the furnace or crucible wherein it is being produced by the fusion of its primary ingredients of silica, alkalies, etc., a thing not heretofore done, and which is much cheaper than the re-blowing of previously manufactured tubes of special high grade and relatively expensive glass.

The localized structural stresses and strains permanently set up in articles of glass, as a result of unequal or highly concentrated heating during their manufacture as herein described under the third step, of the present existing method, are lacking in articles made by my process as no unequal or concentrated heating occurs in their production.

The vacuum within my product is automatically produced by the cooling of the piece, and that only after sealing takes place. There is no exhausting of the interior either necessary or even possible, with my process, as described, the creating cause of the vacuum being a drop in temperature and not air pumps. Actually, under my process, I do not impound a vacuum, but create one within a hollow space that has been previously and hermetically sealed air tight.

Thus it will be seen that my process is widely different in about every conceivable way from the present known methods of manufacture, and even the raw material, glass, being used direct from the crucible and of a different texture, while the principal final product as proposed, i. e. vacuum heat insulating bricks and tiles of glass have heretofore been unknown.

As to a means or material for producing the necessary vapor or gas, which shall be capable of condensing or precipitating at a temperature inferior to that at which glass hardens, etc. it would obviously be impossible for me to confine my process to any particular vapor or gas, or to the material used for producing either one, for the following reasons: Glass being a manufactured product obtained by the fusion of various substances, it may be made so as to melt at quite a wide range of temperatures; then again, different grades or qualities of glass have different degrees of strength and some grades are found to be much more plastic than others at the same temperature. Similarly, one grade of glass may, during the cooling process, reach the point where it becomes brittle, while another grade upon cooling to the same temperature, may be found to still be quite plastic.

Since my process calls for the use of a vapor or gas capable of condensing at a temperature inferior to that at which the glass within which it is enclosed, becomes brittle, etc., and this latter temperature is not fixed but is varied by the composition and even by the thickness of the glass, obviously an equally wide range of temperature could be applied to the condensing point of the gas or vapor.

Again, since in working with glass, we are dealing with comparatively high temperatures, a super-heating effect may be encountered within the mass of glass of which advantage may be taken to expand the material which it is proposed to ultimately condense, as a means of forming a vacuum, or to effect a change in the nature of said material.

There is a vast number of substances, both liquid and solid as well as aqueous, oleaginous, vegetable, metallic and mineralogical whose boiling points are found to be below the temperature at which one kind of glass or another ceases to be plastic, and which might, therefore, be used for the purpose of producing an ultimate vacuum within the hermetically sealed piece as described. I may state, however, as an example, that in the course of my experiments, I have produced high vacuums by the volatilization and subsequent condensation, in the manner described as my process, of a piece of common cast zinc. If resort were to be had to chemistry, metallurgy, etc., the list of such substances might be infinitely lengthened.

It must also be understood that the fact of my specifying that the temperature point at which the impounded vapor or gas shall condense or precipitate shall be inferior to that at which the glass within which it is enclosed becomes hard, etc. is not to be interpreted as meaning that the difference between the relatively inferior and superior temperatures respectively, of the two elements, must necessarily be slight. Some grades of glass may become hard and brittle at a temperature four or five times that at which water boils, yet my experiments have proven that steam used in the manner prescribed by my process, creates, upon condensation, at or about 212 degrees, F., a most excellent vacuum for the purpose intended.

It might well be possible to produce a vapor or gas which would, as the result of the cooling of the piece, precipitate itself upon and over the inner surfaces of the glass and thus combine with and perhaps color the glass, and at the same time by so doing, conveniently remove all trace of the moisture, liquid or solid residue, resulting from the condensing or precipitating processes.

Briefly recapitulating, my process is quite different from that heretofore employed, in that the use of air need not enter into the process of blowing, or the construction of the article in any way. My vacuum is not created by extraneous means. At the time that hermetic sealing of the interior of the piece occurs, I need have no vacuum whatsoever, in fact, may have an internal pressure superior to that of the surrounding atmosphere. I do not impound a vacuum, as is done by all others making somewhat similar products, but I simply impound the means for subsequently creating a vacuum as an unavoidable consequence, rather than as the result of a mechanical operation. Mine is the only process whereby a vacuum is originated within the hollow interior of the piece and is neither created nor temporarily maintained by an external source of suction. In all of the usual forms of the nature of articles described, the air is at first exhausted and then excluded from the hollow interior spaces; there being no necessity for permitting air to enter the hollow interior spaces under my process, no exhaustion of air is required.

I claim:—

1. The improvement in the manufacture of articles having heat-insulating properties due to a vacuum hermetically sealed in glass, which comprises the production, within their interior sealed spaces, of such vacuum as the sole result of the condensation of a gas or vapor confined therein.

2. The improvement in the manufacture of articles having heat-insulating properties due to a vacuum hermetically sealed in glass, which comprises the production, within their interior spaces of such vacuum as the sole result of the presence therein of a gas or vapor while the glass is hot and the spaces are being sealed, and the subsequent condensation of said gas or vapor within the sealed spaces.

3. The improvement in the manufacture of articles having heat-insulating properties due to a vacuum hermetically sealed in glass, which comprises the production, within their interior spaces of such vacuum as the sole result of the presence therein, under a pressure above atmospheric, of a gas or vapor while the glass is hot and the spaces are being sealed, and the subsequent condensation of said gas or vapor within the sealed spaces.

4. The method of manufacturing articles having heat-insulating properties due to a vacuum hermetically sealed in glass, which comprises the production of such vacuum solely by providing within the interior spaces of the mass of heated glass, a condensable gas or vapor; and sealing said spaces while the glass is hot.

5. The method of manufacturing articles having heat-insulating properties due to a vacuum hermetically sealed in glass which comprises the production of such vacuum solely by providing within the interior spaces of the mass of heated glass, a condensable gas or vapor, under pressure above atmospheric; and sealing said spaces while the glass is hot.

6. The method of manufacturing articles having heat-insulating properties due to a vacuum hermetically sealed in glass, which comprises the production of such vacuum solely by forming said articles by expansion of the heated glass under the pressure of a condensable vapor or gas within their interior spaces; and sealing said spaces against the escape of said condensable gas or vapor while the glass is hot.

7. The method of manufacturing articles having heat-insulating properties due to vacuum hermetically sealed in glass, which comprises the production of such vacuum solely by providing within the interior spaces of the mass of heated glass, a condensable gas or vapor; and sealing said spaces by welding against the escape of said gas or vapor, while the glass is hot.

8. The improvement in the manufacture of articles having heat-insulating properties due to a vacuum hermetically sealed in glass, which comprises the production within their previously formed hollow interior spaces, of a vacuum due solely to the condensation of a previously supplied condensable vapor or gas, the condensation of which occurs subsequently to the sealing of said hollow interior spaces.

9. The method of manufacturing articles having heat-insulating properties due to a vacuum hermetically sealed in glass, which comprises the production of such vacuum solely by excluding the air from the interior spaces of the mass of heated glass, by a condensable gas or vapor; and sealing said spaces, by welding, against the entrance of air, while the glass is hot.

10. The improvement in the manufacture of articles having heat insulating properties due to a vacuum hermetically sealed in glass, which comprises the production of such vacuum solely by means of the condensation of a previously impounded gas or vapor under cooling externally applied.

11. The improvement in the manufacture of articles having heat insulating properties due to a vacuum hermetically sealed within their interiors, which comprises the creation of a hollow space within their interiors by the injection into their mass, while still molten of a gas generating element and the creation of a vacuum in said space solely by the condensation of said gas under the cooling of the molten mass.

In testimony whereof I have signed my name to this specification.

JAMES H. DELANY.